March 9, 1926.

R. CONRADER 1,575,623

TANK DISCHARGE DEVICE

Filed July 21, 1921

Rudolph Conrader INVENTOR.

BY

ATTORNEY.

Patented Mar. 9, 1926.

1,575,623

UNITED STATES PATENT OFFICE.

RUDOLPH CONRADER, OF ERIE, PENNSYLVANIA.

TANK-DISCHARGE DEVICE.

Application filed July 21, 1921. Serial No. 486,462.

*To all whom it may concern:*

Be it known that I, RUDOLPH CONRADER, a citizen of the United States, residing at Erie, in the county of Erie and State of Pennsylvania, have invented new and useful Improvements in Tank-Discharge Devices, of which the following is a specification.

It is desirable to provide discharge openings from tanks, such as oil tanks, with strainers. With oil tanks particularly it is desirable to prevent a direct opening from the tank to the discharge pipe because where there is such an opening a vortex forms in the oil and air is carried into the discharge pipe before the tank is emptied and the presence of air in the pipe lines is objectionable. It is desirable, however, when the oil reaches the level of the discharge pipe that air be admitted so that the tank may be closed off by devices that have been provided for that purpose.

It is difficult to place a device of this kind in tanks both from the difficulty of access and the variations in the levels and inward projections of the discharge pipe. In the present invention the device is preferably attached to the discharge pipe itself and is inserted through an opening in the side of the tank that receives the discharge pipe.

The invention is illustrated in the accompanying drawings as follows:—

Figure 1:
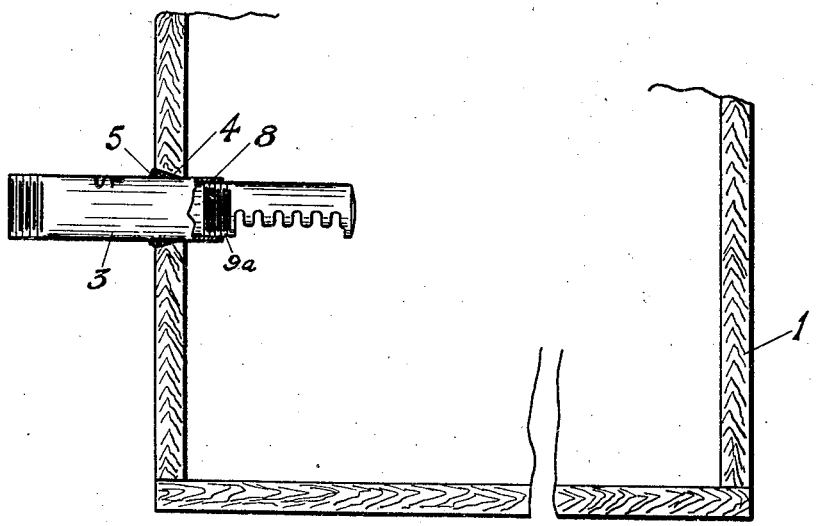

Fig. 1 shows a wooden tank with the discharge strainer in place.

Figure 2:
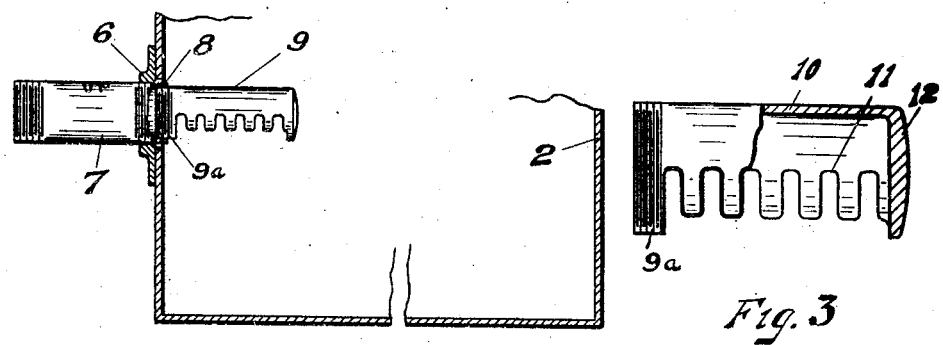

Fig. 2 a similar view of a metal tank.

Figure 3:
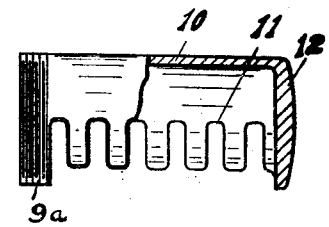

Fig. 3 an enlarged side elevation, partly in section, of the strainer detached.

1 marks the wooden tank, 2 the metal tank, and 3 a discharge pipe from the wooden tank, this pipe extending through an opening 4 in the wall of a tank and being sealed by calking 5. A similar pipe 7 is secured to the metal tank by being screwed through the plate 6 usually provided for this purpose. The discharge pipes are internally threaded at 8 and the strainer 9 has a screw-threaded end 9ª which is screwed into the screw threads 8 of the discharge pipe. The strainer is preferably of cylindrical form of a size to readily enter the opening provided for the discharge pipe and has the closing wall 10 extending over the top of the same and strainer openings through the side walls at 11, these openings extending up to about the middle of the discharge pipe. The strainer is preferably open at the bottom so that any material that might be carried into the strainer will drop by gravity from the strainer after the emptying of the tank. The strainer is closed at the end by a wall 12.

In inserting the strainer in the tank it is preferably put into the discharge pipe, the discharge pipe having indicating marks as "Up" in register with the top of the strainer so that when the strainer is put in place the closed top may be brought with certainty to the upper position. This structure prevents the carrying in of material that may be floating upon the oil and at the same time prevents a direct opening to the discharge pipe and prevents the formation of a vortex carrying in air. While the strainer feature is desirable particularly in open tanks the device is of advantage where simply the covered top and open bottom is used particularly in closed tanks.

What I claim as new is:—

1. A tank discharge strainer having an end adapted to be inserted through a horizontal discharge pipe opening in the tank a distance from the walls of the tank, said strainer being closed at the top and having fingers on the side and being unobstructed at the bottom.

2. A tank discharge strainer having a screw-threaded end adapted to be screwed into a horizontal discharge pipe opening and having a size to be inserted through the discharge pipe opening and to extend some distance into the tank, said strainer being closed at the top and having fingers on the side and being unobstructed at the bottom.

3. A tank discharge device having an end adapted to be inserted into a horizontal discharge pipe opening in a tank and to extend some distance into the tank, said device being of cylindrical shape closed at the top and having fingers on the side and being unobstructed at the bottom.

In testimony whereof I have hereunto set my hand.

RUDOLPH CONRADER